Nov. 18, 1941.   C. BIRDSEYE   2,263,452
PROCESS AND APPARATUS FOR FREEZING FOOD PRODUCTS
Filed March 28, 1941
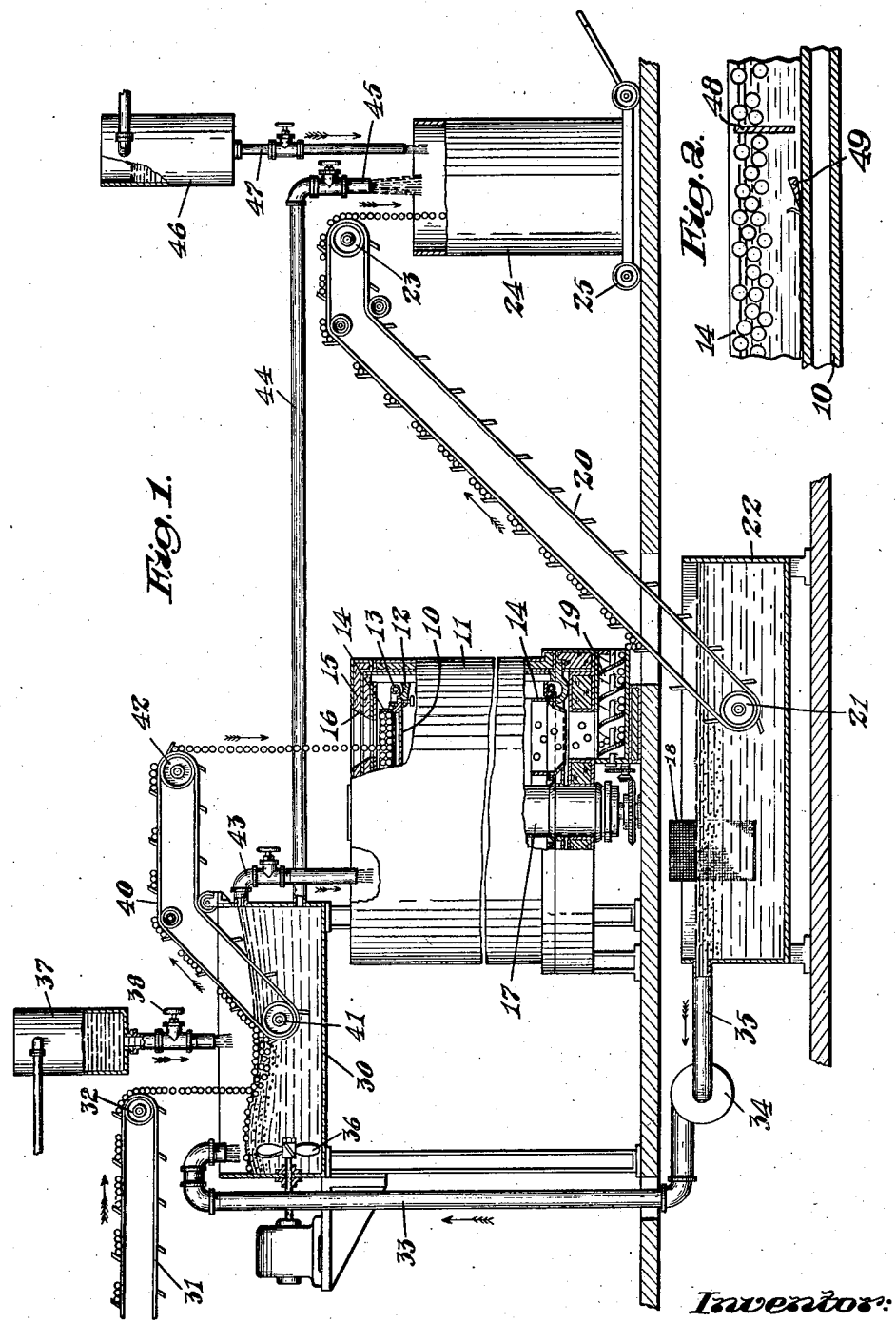
Inventor:
Clarence Birdseye.
by Kenway & Witter
Attorneys Patented Nov. 18, 1941

2,263,452

UNITED STATES PATENT OFFICE 2,263,452

PROCESS AND APPARATUS FOR FREEZING FOOD PRODUCTS

Clarence Birdseye, Gloucester, Mass., assignor to Mechanical Research, Inc., Providence, R. I., a corporation of Rhode Island Application March 28, 1941, Serial No. 385,675

23 Claims. (Cl. 62—104)

This invention consists in an improved process of and apparatus for chilling or freezing food products by employing in a novel manner a liquid secondary refrigerant in which the product is immersed and in which it is moved over one or more refrigerated surfaces.

The process is characterized by passing the liquid refrigerant across and in direct contact with a refrigerated surface, congealing on the surface a part of the water content of the liquid, constantly removing from the surface the resulting minute ice particles, causing said particles to mix with the uncongealed portions of the liquid to form a thin slush, and then liquifying the ice particles by contacting the slushy refrigerant with unfrozen product on its way to or in process of the refrigerating treatment. By thus congealing, or converting to solid phase, a part of the liquid on the refrigerated surface and then utilizing the latent heat of liquifaction of the partially congealed liquid to chill the incoming product I am able to maintain a greater temperature differential between the surface and the refrigerant, and thus to obtain a greater capacity than otherwise in carrying out the process. I am also able to bring about a more rapid heat transfer between the two-phase refrigerant solution and the product to be frozen than by using liquid refrigerant alone. In practice I propose to recirculate the partially congealed liquid refrigerant and mix it with the unfrozen product either outside or inside the apparatus at a rate such that the refrigerant is liquified without substantially increasing its temperature.

In carrying out the novel process of my invention I may employ a series of refrigerated plates and direct the flow of the liquid refrigerant with the immersed food product by gravity or otherwise over the plates one after another, recirculating the slush-containing liquid so as to increase the refrigerating effect of the refrigerant as it is delivered to the uppermost plate of the series along with the relatively warm product to be frozen. The ability to slush some of the liquid refrigerant, that is, to convert a portion of it to solid phase and to use the reservoir of refrigeration thus set up constitutes one of the principal reasons why the process of my invention has such a high capacity and efficiency for freezing berries, sliced fruits, shrimp, peas, and other relatively small food units. In practice I have found that the recirculated liquid refrigerant, even after work has been performed by it, will reach the uppermost plate of the series at approximately the same temperature at which it emerges from the lowermost plate of the series.

The process of my invention may be advantageously applied to the freezing of food products which are in danger of being impaired by oxydation, such as sliced peaches or pitted sour cherries. In accordance with the present invention the product after having been fully prepared for freezing is immediately immersed and continuously maintained in a liquid refrigerant, such as a sugar syrup, which safeguards it from oxydation by keeping air away from it during the entire freezing process. When such foods are frozen by direct immersion in a secondary refrigerant, such as syrup, there is an exchange of ingredients between the product and the syrup, e. g. sugar passes into the product and liquid from the product to the syrup. Thus the syrup is continuously decreased in density and increased in volume; and heretofore this is made necessary the addition of sugar to the syrup, to maintain the desired specific gravity. Under these circumstances, also, the volume of syrup—or other secondary liquid refrigerant—eventually becomes too great to be contained in the circulatory system of the freezing apparatus; and this surplus must be frequently removed and disposed of. It is a valuable characteristic of the present invention that the above described progressive dilution may be economically counteracted by removing from the liquid refrigerant the requisite amount of water in the form of the ice crystals which have been formed in the liquid during the slushing process.

While the process of my invention relates principally to the chilling or freezing of food products, its practice results in the efficient formation of ice crystals in large quantities and these may be removed and used as a by-product of the process, or if desired, the process may be carried out with liquid alone for the primary purpose of producing ice crystals.

In another aspect the present invention is an improvement on the process described and claimed in my copending application Ser. No. 331,991, filed April 27, 1940, wherein I have pointed out certain advantages of freezing food products by immersing or floating the product in a liquid refrigerant which is cooled by and passed over and in contact with a refrigerating surface or surfaces.

As a liquid refrigerant I contemplate employing brine, sugar solution, a neutral solution of mixed sugar and salt or any other liquid having a low freezing point and which may be suitable for the product to be treated.

The features and advantages of my novel process will be best understood and appreciated from the following detailed description thereof and of one of many specific forms of apparatus suitable for carrying out my novel process and illustrated in the accompanying drawing in which, Fig. 1 represents diagrammatically one form of apparatus suitable for carrying out the novel process, and Fig. 2 is fragmentary sectional view of one of the plates.

The illustrative apparatus includes a series of stationary hollow refrigerated plates 10 supported in horizontal position and in spaced relation one above another within the cylindrical heat insulating casing 11. The plates are supported upon brackets 12 mounted within the casing 11 and are provided with pipe connections 13, shown only fragmentarily, by which brine, ammonia, or other refrigerating medium may be supplied internally to the plates and the latter thus maintained at any desired temperature, for example 0° F. As herein shown, though not necessarily, the refrigerated plates 10 are annular in shape, being provided with a central opening and having concentric inner and outer circular walls 14, one only of which is shown in the drawing. Each plate is provided at one area in its surface with a discharge opening through which the product may fall from it to the next lower plate, and these openings are arranged in staggered relation.

The casing 11 is closed by a cover 15 in which is provided a receiving opening 16 through which the product to be treated may pass to the surface of the uppermost plate of the series. A vertical shaft 17 passes through the open passage at the center of the refrigerated plates 10 and is provided with means for advancing the product, immersed in liquid refrigerant, across the surface of each refrigerated plate 10 until it arrives at the opening therein. This means may comprise or include radial walls 48 and lateral walls forming an open-bottom grill resting on the surface of the plate between the circular walls 14 that define the product treating zone and connected to the shaft for movement in a radial path. Also included in the product-moving means are sharp edged scrapers 49 disposed radially or substantially so and effective to remove from the refrigerated surfaces of the plates the film of congealed liquid refrigerant as it is formed thereon and to mix it with the refrigerant. The mechanism thus far described is substantially that shown in my copending application above identified, and in my earlier Patent No. 2,229,000, January 14, 1941, to which reference may be had for further details of construction.

The lowermost plate 10 of the series is provided with a discharge opening located in alignment with a similar opening in the bottom of the casing which leads to a horizontal screw conveyor 19 by which the frozen product and partially congealed liquid refrigerant are carried outwardly and delivered to an inclined conveyor 20. The latter runs over a lower pulley 21 located beneath the casing 11 in a tank 22 and an upper pulley, 23, being guided at its upper end by guide pulleys into a short horizontal path. The pulley 23 is so located as to cause the conveyor to drop its frozen product into a receiving container herein shown as a drum or barrel 24.

In the illustrated apparatus the tank 22 is shown as located beneath the floor which supports the casing 11 but any convenient arrangement of the elements of the system may be adopted. The conveyor 20 is provided with a series of flights which hold the frozen product in its passage upwardly on the conveyor while permitting the liquid and partially congealed secondary refrigerant to drain off and flow back into the tank 22. In operation the tank 22 usually contains the refrigerating liquid and the suspended minute ice crystals which constitute the solid portion of the slush floating therein. The level of this mixture in the tank 22 is maintained constant by an overflow outlet pipe 35. A conveyor 18 having a perforated belt is provided for removing a regulated amount of the ice crystals from the mixture in the tank 22 in order to maintain the desired concentration of the refrigerant solution.

Above and adjacent to the casing 11 is mounted a supply tank or reservoir 30 and to this reservoir is delivered the slush and liquid mixture from the tank 22, through the medium of a centrifugal pump 34 and the vertical pipe 33. A constant circulation of the slush-containing liquid is maintained in the reservoir 30 by a motor driven agitator 36. The product to be frozen is also delivered to the liquid mixture in the reservoir 30 by a conveyor 31 of which one end is shown in the drawing as passing over a guide pulley 32. Means are provided for supplying fresh refrigerant to the system and delivering it to the reservoir 30. As herein shown this may comprise a tank 37 having a valve 38 and an outlet pipe discharging directly into the reservoir.

In order to remove the chilled product from the reservoir 30 and deliver it to the refrigerated plates, a conveyor 40 is provided which runs about a pulley 41 immersed in the reservoir 30, thence upwardly and about guide pulleys to a pulley 42 which is located vertically above the receiving entrance 16 in the top of the casing 11. The pre-chilled product is carried up on this conveyor 40 and dropped through the opening 16 upon the uppermost refrigerated plate 10 of the series. The reservoir 30 is provided with a valved outlet pipe 43 which discharges the liquid refrigerant through another opening in the cover 15 of the casing and upon the uppermost refrigerated plate 10 therein. The valved outlet pipe 43 is arranged at the opposite side of the reservoir 30 from the agitator 36 so that the effect of the agitator is to circulate the liquid refrigerant toward the outlet pipe after its contained ice crystals have been liquified by heat absorbed from the unfrozen product delivered to the reservoir.

The reservoir 30 is provided with a second outlet pipe 44 which extends horizontally to a position over the receiving container 24 where it is provided with a down-turned valved discharge section 45. Adjacent to the pipe 45 is also provided a reservoir 46 for concentrated syrup or other liquid which it may be desired to add to the frozen product preparatory to packing. The reservoir 46 is provided with a discharge pipe 47 directed to the receiving container 24. In the drawing the container is shown as carried by a truck 25 and when one container has been filled with the frozen product together with the desired amount of liquid it may be removed and replaced by an empty container.

In carrying out the process of my invention, with the assistance of the illustrated apparatus, for freezing such food products as peas, beans, strawberries, sliced peaches, etc. it may be assumed the plates 10, of which there may be ten to twenty in number, are maintained at a temperature of 0° F. to —20° F., that the product is being continuously supplied to the uppermost plate of the series by the conveyor 40 and that a secondary refrigerating medium, such as a neutral solution of salt and sugar, is being supplied through the vertical pipe 43 at a temperature of perhaps 20° F. and in sufficient quantity to immerse or float the product confined within the circumferential walls upon the uppermost refrigerated plate 10. As the shaft 17 rotates the immersed product is carried circumferentially over the refrigerated surface of the plate in a circular path until it reaches the discharge opening in that plate. The secondary refrigerant and the product then immediately pass to the next lower plate where they are similarly passed over its refrigerated surface, falling to the next lower plate and so on until they reach the conveyor 19. In their passage over the refrigerated plates 10 heat is extracted both from the product and from the secondary refrigerant, the product becoming quick-frozen and the liquid refrigerant being partially congealed in a film on the surface of the plates. This frozen film is immediately scraped off and mixed with the liquid refrigerant. Accordingly when this two-phase mixture is delivered to the conveyor 20 the frozen product is carried up the incline and delivered to the container 24 in wet condition while surplus liquid and slush is returned by gravity to the tank 22.

The mixture of liquid refrigerant and slush is continuously drawn from the tank 22 by the centrifugal pump 34 and delivered to the reservoir 30, still as a mixture of slush and liquid. To this reservoir is delivered by means of the conveyor 31 the fresh unfrozen product. The latter is immediately immersed or floated in the reservoir 30 and the heat of the product thus brought into the mixture serves to melt the slush contained therein. Circulation is maintained in the reservoir 30 by the agitator 36 and the rate of supply to the reservoir of the slush-containing refrigerant and of the unfrozen product is balanced so that the latent heat of the slush is utilized in chilling the unfrozen product, but without substantially raising the temperature of the liquid refrigerant itself. Accordingly the liquid refrigerant delivered to the refrigerated plates through the outlet pipe 43 is of substantially the same temperature, but contains less slush than when it entered the tank 30, and the product is substantially chilled before it reaches the first refrigerated plate of the series. It will be apparent that the freezing process to which the chilled product is subsequently subjected may therefore be carried out with greater efficiency than if unchilled product were to be delivered direct to the series of refrigerated plates.

In order to prevent oxydation of or loss of moisture from sliced peaches, pitted sour cherries, etc. it is desirable to maintain the frozen product immersed in a suitable liquid medium during both freezing and subsequent cold storage. In the illustrated system the outlet pipe 44 constitutes convenient means for delivering to the container 24 a controlled amount of the liquid secondary refrigerant and in many cases this is all that is required. If, however, for storage purposes it is desired to increase either ingredient of the solution, for example, the sugar syrup ingredient or to add a new ingredient, the added material may be supplied from the reservoir 46 in the amount required, or, instead of a liquid as suggested in Fig. 1, a dry material such as granulated sugar may be added to the product in the container 24. On the other hand, makeup solution may be supplied to the whole system from the tank 37 which as already explained is arranged to discharge into the reservoir 30. The control of this source of supply is a matter depending on the particular type of product being frozen and the conditions under which the work is being done. During the continuous operation of the process the conveyor 18 may be operated continuously or periodically to remove ice crystals of substantially pure water from the mixture contained in the tank 22, thus preventing dilution of the refrigerant solution and increase in its volume that would otherwise take place by reason of the extraction of liquid from a product.

The term "freezing" as used herein should be construed broadly as meaning chilling or congealing the food product to any desired degree. In practice the freezing may be either partial or complete as may be required by the nature of the product, the freezing point of the liquid refrigerant, the time the food product is maintained in contact with the refrigerant or other consideration of the particular work in hand. Further, and as already intimated the process of my invention may be carried out with the primary object of chilling or congealing any liquid which may be caused to flow over the refrigerated plates without carrying an immersed food product.

Having thus disclosed my invention and described in detail one form of apparatus by which the novel process may be carried out, but only in an illustrative sense, I claim as new and desire to secure by Letters Patent:

1. The process of freezing food products, which includes the steps of moving the product, while immersed in liquid refrigerant, across a refrigerated surface until the refrigerant is partially converted to slush, separating the product from the liquid and slush, and partially liquifying the slush by contacting the liquid containing it with unfrozen product on its way to the refrigerating surface and thereby chilling the unfrozen product.

2. The process of freezing food products, which consists in mixing unfrozen products with a liquid refrigerant initially containing frozen slush, separating the two at such a rate that the slush is at least partially liquified by heat from the unfrozen products, and then passing the chilled product, while immersed in the liquid refrigerant, across a refrigerated surface.

3. The process of freezing food products, characterized by the steps of continuously recirculating a liquid refrigerant in a path including passage over a series of refrigerated surfaces and thus converting a portion of the refrigerant to slush, partially melting the slush by contact with the product to be frozen before the refrigerant arrives at said refrigerated surfaces and thus chilling the product, and immersing the chilled product in the liquid refrigerant as it repasses over said surfaces.

4. The process of freezing food products, characterized by the steps of circulating a liquid refrigerant in an endless path including passage over a refrigerated surface and thus converting a portion of the refrigerant to slush, and immersing the product to be frozen in the liquid refrigerant during the progress of the refrigerant throughout a limited portion of its circulating path.

5. The process of freezing food products, characterized by the step of mixing the product to be frozen with a liquid refrigerant containing ice particles congealed from the said refrigerant, thus transferring heat from the product to the ice particles and liquifying said particles, and then simultaneously further lowering the temperature of the product and reconverting part of the refrigerant to slush by immersing the chilled product in the liquid refrigerant and passing both over and in contact with a refrigerated surface.

6. The process of freezing food products which consists in pre-chilling the product, delivering the pre-chilled product and a liquid refrigerant continuously to a refrigerated surface, moving the product, while immersed in the refrigerant, across the said surface until the product is frozen and a portion of the refrigerant converted to slush, and then separating the frozen product from the slush-containing refrigerant.

7. The food freezing process which includes the steps of bringing food units into direct heat exchange relation with a fluid having a substantial part of its water content present in the form of minute ice particles, thereby thawing the ice particles, and thereafter passing both the product and the fluid across and in respectively indirect and direct heat exchange relation with a flat refrigerated surface maintained at a temperature lower than that of either the food product or the fluid, thus both congealing a part of the water content of the food units, and forming additional ice particles in the fluid to replace those thawed in the prior contact of the food units and the fluid.

8. The process of freezing small food units, which includes the steps of first removing heat from the product to be frozen by bringing said product into direct heat exchange contact with a fluid refrigerant consisting of a mixture of liquid and partially congealed portions thereof, and then further lowering the temperature of the food product and simultaneously congealing portions of the fluid refrigerant by passing the refrigerant and the product across, and with the refrigerant in contact with, a flat refrigerated surface held at a temperature lower than the freezing point of the refrigerant.

9. The process of treating food products, characterized by the steps of freezing the product while immersed in a liquid refrigerant in passage over a refrigerated surface and simultaneously converting a portion of the refrigerant to slush, separating the frozen product from the slush, and then immersing the product in a liquid solution more concentrated than the refrigerant.

10. The process of treating food products, characterized by the steps of freezing the product while immersed in a liquid refrigerant in passage over a refrigerated surface and simultaneously converting a portion of the refrigerant to slush, separating the frozen product from the slush-containing refrigerant, thawing the slush by mixing unfrozen product with the refrigerant, and immersing the previously frozen product in a solution containing a portion of the refrigerant.

11. In an apparatus for freezing food products consisting of masses of relatively small units such as shelled peas, lima beans, shrimp, strawberries, sliced peaches and the like; a series of flat, refrigerated heat conductive surfaces, means for passing over and in contact with said surfaces a fluid refrigerant, means for directly contacting the food units with said refrigerant so that heat is transferred from the food units through the refrigerant to the surfaces, means for holding the surfaces at a temperature so low that some of the refrigerant congeals onto the surfaces, means for removing said congealed refrigerant from the surfaces and mixing it with the uncongealed part of said refrigerant, means for separating the food product from the refrigerant after the former has been lowered to the desired temperature, means for passing both the liquid and the congealed portions of the refrigerant to another heat exchange area in which the congealed part of the refrigerant is at least partially thawed by heat from additional product to be frozen, and means for passing both the said additional product and the said refrigerant onto and along the refrigerated surfaces first mentioned, so that the additional product may be lowered to the desired temperature and the refrigerant recongealed to the desired degree.

12. In an apparatus for cooling liquids, the combination of a series of flat heat conductive plates, means for confining upon the upper surfaces of the plates the liquid to be cooled, means for moving the liquid across the surfaces of the plates and from one to another of the plates, means for maintaining the plates at a temperature low enough so that some of the liquid congeals onto the plates, means for removing from the plates congealed liquid, and means for discharging the cooled and partially congealed liquid from the apparatus.

13. Apparatus for freezing food products, which includes a series of refrigerated plates, a tank located to supply liquid refrigerant to the series, a second tank located to receive liquid refrigerant and slush from the series, means for circulating the mixture from the receiving tank to the supply tank, and means for passing unfrozen product through the supply tank, thereby thawing the slush and chilling the product.

14. Apparatus of the character described in claim 13 organized to present at a single station frozen product from the receiving tank, and liquid refrigerant from the supply tank and having independent means for supplying concentrated solution at the same station to be added to the immersed frozen product.

15. Apparatus of the character described in claim 13 in which the supply tank is provided with power driven means for circulating the mixture of refrigerant and slush.

16. Apparatus for freezing or chilling food products, which includes a series of flat refrigerated plates, means for delivering a liquid refrigerant to one plate and directing flow of the liquid in shallow streams across all of said plates with the food product immersed therein, a scraper for removing ice crystals frozen from the refrigerant upon the surfaces of the plates beneath the refrigerant, and means for removing from the liquid refrigerant the ice crystals thus formed and so concentrating the liquid refrigerant.

17. In an apparatus for freezing food products consisting of masses of relatively small units, a series of flat refrigerated heat conductive metal surfaces, means for passing over and in contact with said surfaces a fluid refrigerant with the food units in direct contact therewith so that heat is transferred from the units through the refrigerant to the surfaces, means for holding the surfaces at a temperature so low that some of the refrigerant congeals on to the surfaces, means for removing said congealed refrigerant from the surfaces and mixing it with the uncongealed part of said refrigerant, means for separating the food product from the refrigerant after the former has been lowered to the desired temperature, and means for recirculating the mixture of liquid and congealed refrigerant together with additional food products over said series of refrigerated heat conductive surfaces.

18. The process of concentrating edible liquids which includes the steps of passing the liquids in shallow streams over a series of superposed flat heat-conductive plates held at a temperature sufficiently low to cause a portion of the liquid to congeal on the plates, separating the congealed portion of the liquid from the plates beneath the liquid and mixing it with the uncongealed portion of the liquid on said plates, discharging the partially congealed liquid from the plates and then separating the congealed from the uncongealed portions of the liquids.

19. The process of treating food products, characterized by the steps of freezing the product while immersed in a liquid refrigerant solution circulated continuously in an endless path across an extended refrigerated surface and continuously cooled thereby, converting a portion of the circulating product-carrying refrigerant to slush, separating the frozen product from the refrigerant solution, and systematically removing slush from the circulated solution to maintain its concentration against dilution by moisture from the product.

20. The process of treating food products, characterized by the steps of circulating and recirculating a liquid refrigerant solution in a continuous path including in its course a refrigerated surface, converting water in the solution to solid phase in the form of ice crystals upon said surface, removing from said surface the ice crystals as formed and mixing them with the liquid phase refrigerant, immersing the product in the two-phase refrigerant thus provided for an interval sufficient to freeze it, and finally separating the frozen product from the two-phase refrigerant solution.

21. The process of treating food products, characterized by the steps of circulating a stream of refrigerant solution in a closed path extending in part over a refrigerated surface, freezing out a part of the water content of the solution as ice crystals, conveying the product in the refrigerant stream across the said refrigerated surface, and at the same time freeing ice crystals therefrom and mixing them with the product-carrying stream.

22. The process of chilling food products, characterized by the steps of circulating a stream of refrigerant solution in a continuous path, freezing out as ice crystals a part of the water content of the solution during its flow in one part of its continuous path, mixing the crystals in the solution, immersing the product to be chilled in the two-phase solution thus provided, and systematically removing ice crystals from the solution in an amount maintaining its concentration against substantial dilution.

23. Apparatus for freezing or chilling food products, which includes in its structure a refrigerated surface, means for causing the continuous flow of a refrigerant solution across said surface whereby a part of its water content may be frozen out as ice crystals on said surface, means for freezing ice crystals and mixing them with the liquid phase solution, means for delivering product to be frozen to the refrigerant stream, means for removing the frozen product therefrom, and means for removing a regulated amount of ice crystals from the stream and thus maintaining its concentration against substantial dilution.

CLARENCE BIRDSEYE.

DISCLAIMER 2,263,452.—*Clarence Birdseye*, Gloucester, Mass. PROCESS AND APPARATUS FOR FREEZING FOOD PRODUCTS. Patent dated November 18, 1941. Disclaimer filed January 12, 1945, by the assignee, *Mechanical Research, Inc.*

Hereby disclaims from claim 4 any process of freezing food products, except wherein the immersed product to be frozen is passed with the liquid refrigerant across and in contact with a horizontally disposed refrigerated surface.

[*Official Gazette February 13, 1945.*]